United States Patent [19]

Baldwin et al.

[11] Patent Number: 5,315,679
[45] Date of Patent: May 24, 1994

[54] OPTICAL FIBERS DUPLEX CONNECTOR ASSEMBLY

[75] Inventors: Clark F. Baldwin, Vestal; David B. Howe; Thomas B. Kellerman, both of Binghamton, all of N.Y.

[73] Assignee: International Business Machines Corporation, Armonk, N.Y.

[21] Appl. No.: 874,162

[22] Filed: Apr. 27, 1992

[51] Int. Cl.⁵ .................... G02B 6/00; G02B 6/36
[52] U.S. Cl. .................................................. 385/76
[58] Field of Search ............ 385/76, 77, 78, 79, 385/87, 88, 89

[56] References Cited

U.S. PATENT DOCUMENTS

| | | | |
|---|---|---|---|
| 4,167,303 | 9/1979 | Bowen et al. | 385/100 |
| 4,291,943 | 9/1981 | Binek et al. | 385/100 |
| 4,611,887 | 9/1986 | Glover et al. | 385/88 |
| 4,657,340 | 4/1987 | Tanaka et al. | 385/77 |
| 4,687,291 | 8/1987 | Stape et al. | 385/88 |
| 4,744,629 | 5/1988 | Bertoglio et al. | 385/77 |
| 4,759,599 | 7/1988 | Yamaguchi et al. | 385/77 |
| 4,773,726 | 9/1988 | Ito | 385/88 |
| 4,787,706 | 11/1988 | Cannon et al. | 385/88 |
| 4,863,235 | 9/1989 | Anderson et al. | 385/100 |
| 4,953,929 | 9/1990 | Basista et al. | 385/88 |
| 4,979,792 | 12/1990 | Weber et al. | 385/88 |
| 5,005,939 | 4/1991 | Arvanitakis et al. | 385/88 |
| 5,016,968 | 5/1991 | Hammond et al. | 385/88 |

OTHER PUBLICATIONS

Research Disclosure, Feb., 1991, No. 322, "Enhanced SC Duplux Cable Adapter (32245)".

*Primary Examiner*—Akm E. Ullah
*Attorney, Agent, or Firm*—Lawrence R. Fraley

[57] ABSTRACT

An optical fiber duplex connector assembly wherein two individual optical fiber connectors are positioned and retained within a common housing, such that relative freedom of movement between the two connectors within the common housing facilitates positioning of the retained two connectors within a suitable receiving common housing (e.g., shroud). Such movement accomodates for manufacturing tolerances within the housing and/or connectors while still assuring successful insertion. A housing, having two chambers (one for each connector) and a cover assures the defined movable connector positioning while also providing effective retention. A boot may be attached to the housing to accomodate for severe bends and turns of the optical fiber cable, without loss of attenuation.

24 Claims, 3 Drawing Sheets

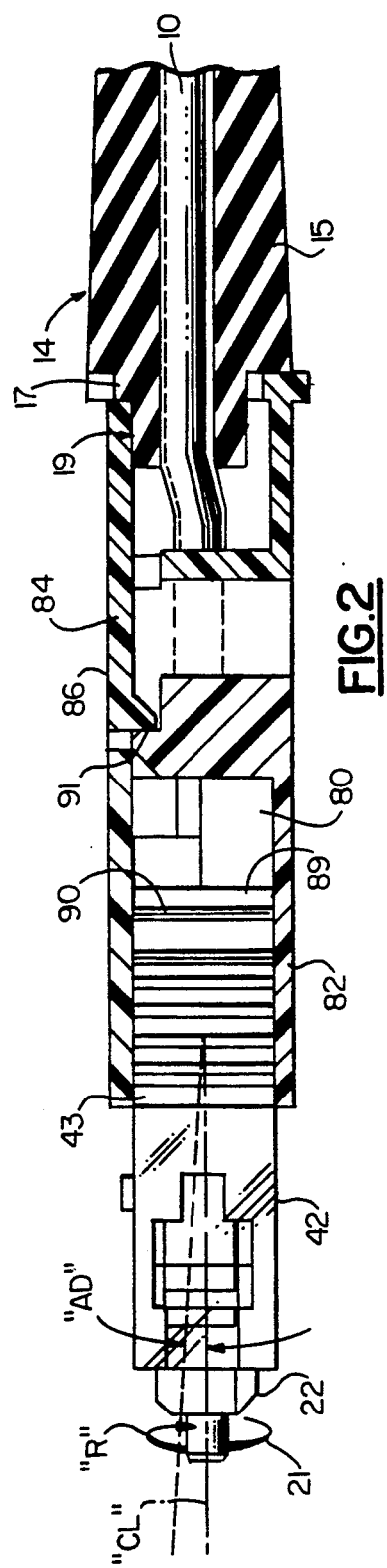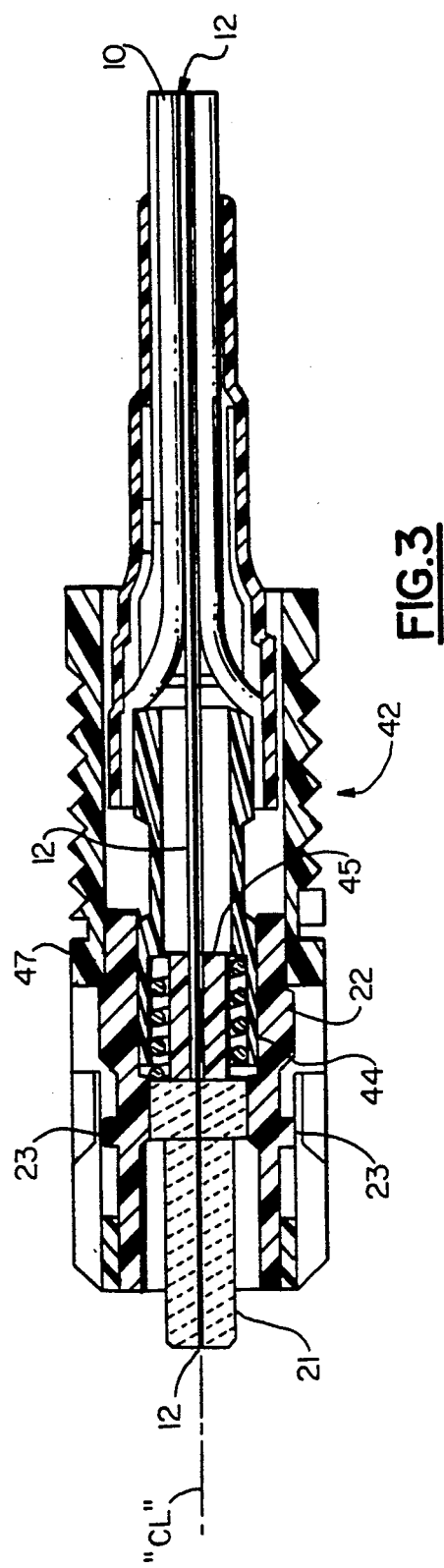

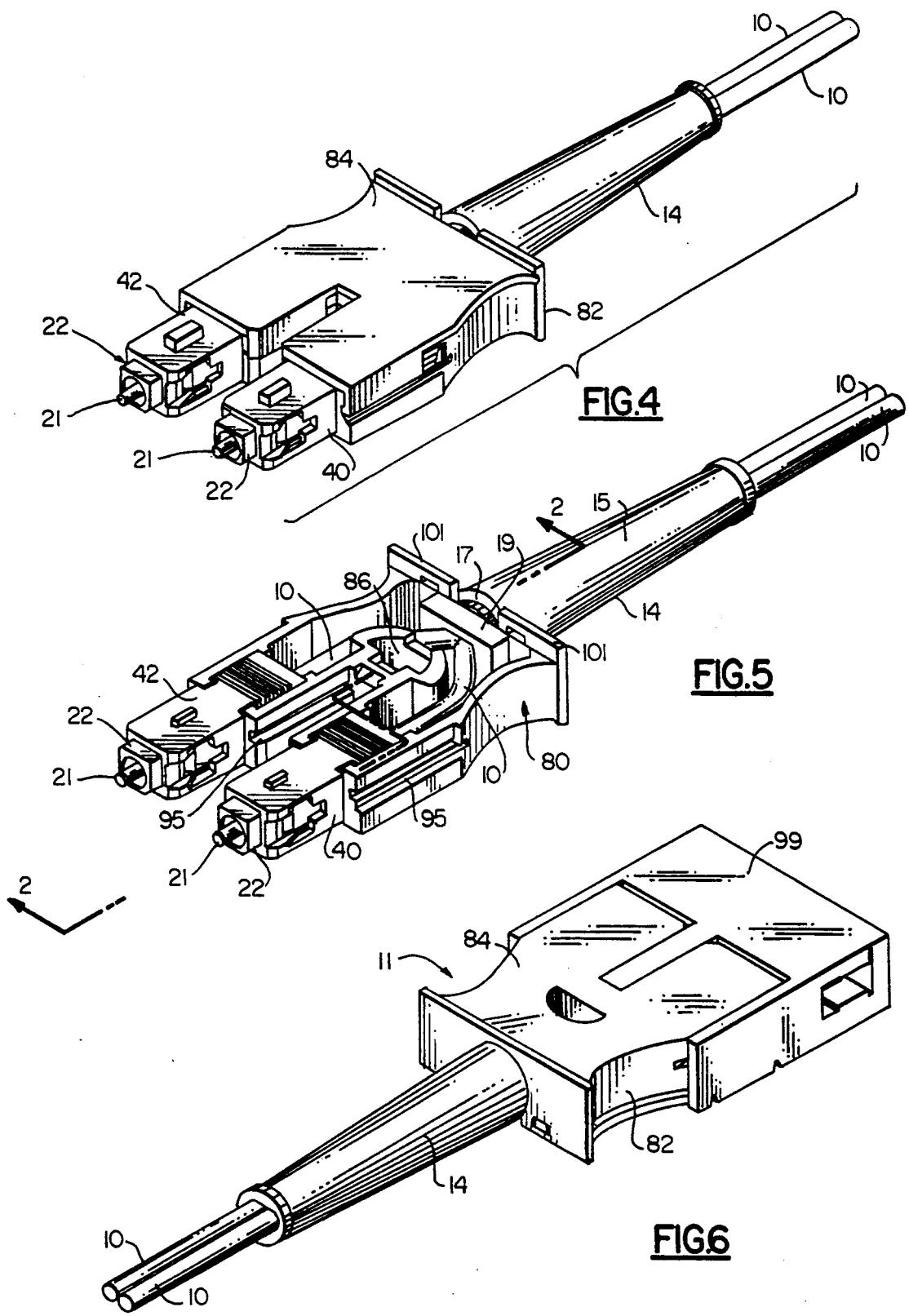

OPTICAL FIBERS DUPLEX CONNECTOR ASSEMBLY

This invention relates to duplex optical connector assemblies and particularly to those designed for providing positive alignment and connection, optically, between pairs of singular, optical fiber connectors and a respective optoelectronic component or another such pair.

BACKGROUND OF THE INVENTION

The use of optical fiber as a transmission medium is growing at an accelerating rate. The advantages of optical fibers over other forms of transmission media are well known. The potential bandwidth (or message carrying capacity) of optical fibers is extremely high. Systems using optical fibers are resistant to electromagnetic interference which sometimes plagues systems having electrical cables. In addition, optical fiber cabling offers a higher degree of data security than such electrical cables, as it is more difficult for unauthorized personnel to tap or access an optical fiber cable without being detected.

Optical fiber devices use single or multiple strands of fibers each having an inner circular glass core coated with a circumferential cladding having a different index of refraction. Light is transmitted along the core and totally reflected from the interface between the core and cladding. Such devices can be used as transmission lines for transmitting information bearing light energy. A transmission line can be formed from a single fiber or it can include a plurality of fibers bundled together as a cable. Additionally, several transmission lines can be arranged in parallel for the simultaneous transmission of information along each of the separate lines.

Where the transmission line is relatively long and extends between different pieces of apparatus, the transmission line is divided into segments and the different segments are connected to each other using separable optical fiber connectors which have been developed to meet this need. Typically, such connectors are positioned within a common housing (or adapter) in opposing relationship. The principle design criteria of such connectors is to connect the transmission lines in an end-to-end relationship in such a manner as to minimize the loss of light energy as light traverses from one end of one line into the end of the adjacent segment of that line. Such minimal loss between the connected fibers is essential when the optical fibers, which typically terminate in ferrules located in a connector body, are aligned coaxially and when the fiber faces, each of which is typically planar, contact in a common plane. Optical fiber connectors must be designed to bring the ends of the transmission lines into as perfect an axial alignment as possible in order to assure such minimal loss. Considering the size of the fibers (e.g., one with a core diameter of about 10 microns and a cladding diameter of 100 to 150 microns), the task of alignment is, understandably, a challenging one.

When a transmission line is comprised of a plurality of individual fibers joined together to form a bundle or cable, for the transmission of a single piece of information along the line, the alignment of each individual fiber, one to another, is not critical, as any light energy escaping from one fiber would be accepted into the fibers on the other side. However, where a transmission line is made up of a single individual fiber, it is extremely critical that perfect alignment take place, as any escaping light energy may be lost.

There presently exist various connector assemblies in the art which are capable of attaining end-to-end alignment, once the selected individual optical fiber connectors (each having at least one optical fiber and ferrule located in a suitable body (or housing)) are positioned within a designated common housing or adapter. Due to manufacturing tolerances, however, proper alignment between these individual connectors and common housing is often difficult, particularly when attempting to align and position paired arrangements of such individual connectors. To accomplish this, individual optical fiber and ferrule subassemblies have been encased within a singular housing, often referred to in the art as a duplex connector, and then inserted within the corresponding, common housing. Separation of these individual connectors (typically two) in such a substantially fixed arrangement is, obviously, difficult. Because of this relatively rigid form of encasement, flexibility of movement between the ends of these individual components is substantial prohibited, thus complicating final alignment and positioning of the connectors within the designated common housing.

As will be defined herein, the instant invention provides what can also be referred to as a duplex connector, but one wherein originally separate, individual optical fiber connectors (including fiber, ferrule and a suitable body, or housing) are retained in not only a side-by-side orientation capable of being inserted within a corresponding common housing( to form a connector assembly) but also an orientation which permits freedom of movement between said individual connectors so as to accomodate for manufacturing tolerances in the common housing and/or housings of the individual connectors, thereby facilitating such alignment. Additionally, the duplex connector as defined herein meets current standards for keying variations, using easily changed covers which snap securely into place.

It will be understood from the teachings herein that the duplex connector assembly of the invention is adapted for being precisely oriented within an adapter such as mentioned above (e.g., wherein a matching pair of connectors in another common housing are positioned in the adapter's opposite end for alignment with the invention's paired connectors), or, alternatively, within a common housing (also occasionally referred to as a shroud) such as the one defined in U.S. Pat. No. 5,005,939, which patent is incorporated herein by reference. Concerning the latter, the defined motion (a/k/a "float") of the invention accommodates for manufacturing tolerances in the receiving portions (a/k/a "bores") of such a common housing. Understandably, such "float" also facilitates positioning and alignment within a common adapter such as defined above. One example of an adapter for receiving at least one duplex connector is shown in U.S. Pat. No. 4,687,291, and referred to as an interconnect member. This interconnect member may also receive a pair of single connectors within an opposing end thereof. It is understood that the invention is also adapted for being positioned within such an interconnector, to thereby couple with an associated pair of singular connectors located therein.

It is believed that such an assembly would constitute a significant advancement in the art.

DISCLOSURE OF THE INVENTION

It is, therefore, a primary object of the invention to provide an optical fiber connector assembly wherein individual optical fiber connectors are permitted relative freedom of movement therebetween to thereby enable those retained connectors to be inserted, with optimal alignment, within a common housing in a facile manner.

It is another object of the invention to provide such an assembly which is relatively easy to operate, which is of relatively simple construction, and which can be produced in a relatively inexpensive manner.

In accordance with one aspect of the invention, there is provided an optical fiber connector assembly including a first housing, a pair of second housings, each of the second housings including therein an optical fiber and a ferrule secured to an end of the optical fiber, the ferrule movably positioned within t second housing, and a pair of third housings, each of the second housings being movably positioned within a respective one of the third housings, each of the third housings being movably positioned within the first housing.

BRIEF DESCRIPTION OF THE DRAWINGS

FIG. 2 is a side elevational view, in section, of the connector assembly of FIG. 1, shown on a larger scale;

FIG. 3 is a top view, in section, and on a larger scale over the assembly of FIG. 2, of one of the individual optical fiber connectors for use in the invention, this and a similar such connector being movably positioned within the invention's first housing;

FIG. 4 is a front perspective view of the connector assembly of FIG. 1, as assembled;

FIG. 5 is a perspective view of the assembly of FIG. 4, with the cover portion removed; and FIG. 6 is a rear perspective view of the duplex optical fiber connector assembly of FIG. 1 as positioned within a common housing (shroud) or the like.

BEST MODE FOR CARRYING OUT THE INVENTION

Figure 1:
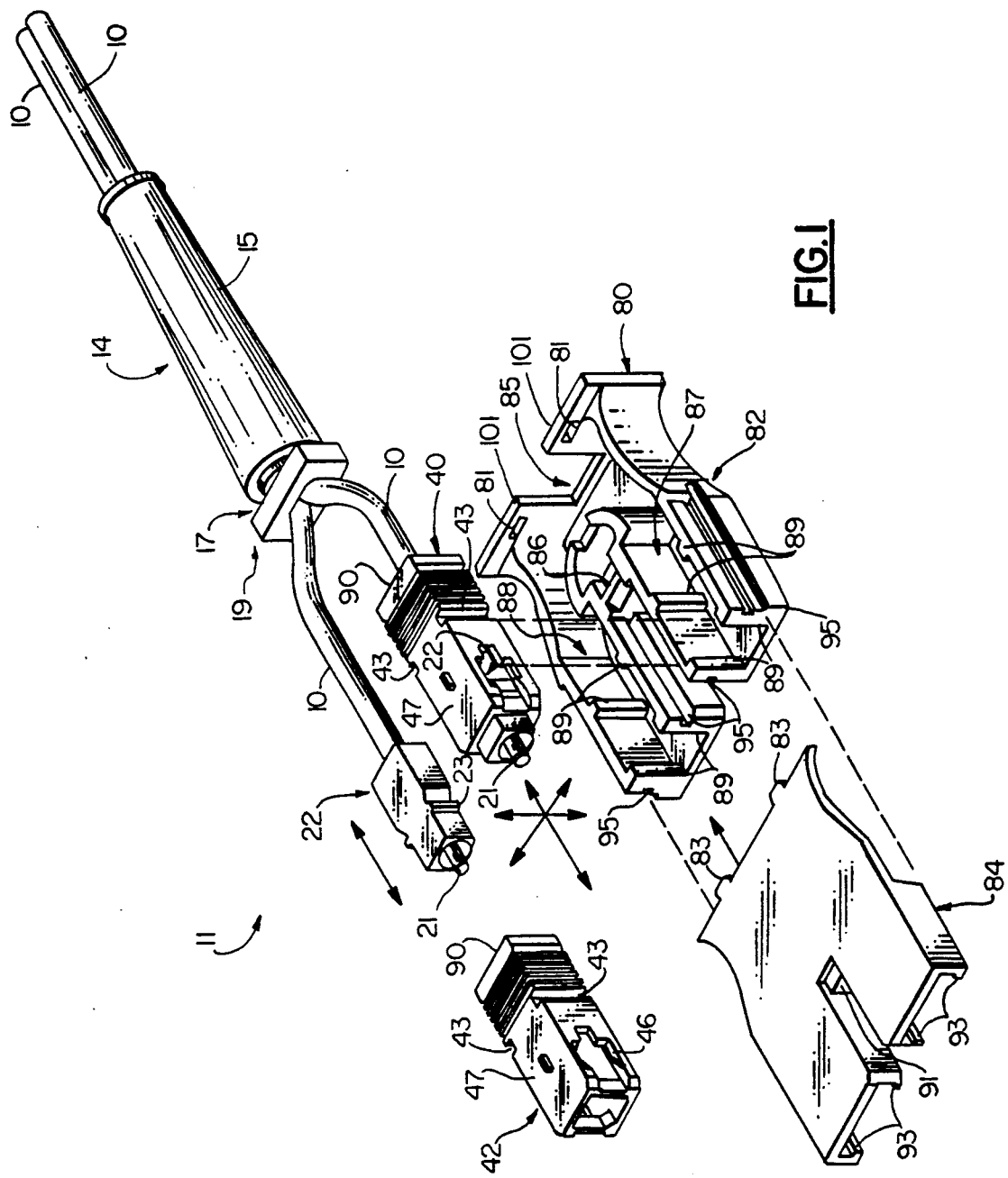
FIG. 1 is a front perspective view of an optical fibers duplex connector assembly in accordance with a preferred embodiment of the invention.

For a better understanding of the present invention, together with other and further objects, advantages and capabilities thereof, reference is directed to the following disclosure and appended claims, in connection with the described drawings.

In FIG. 1, there is shown an optical fiber duplex connector assembly 11 in accordance with a preferred embodiment of the invention. Assembly 11 includes a first housing 82 which is adapted for housing a pair of singular, optical fiber connectors 40 and 42 therein. As understood from the following, each connector 40 and 42 includes an outer (third) housing 47 (defined below) into which is inserted another (second) housing (22). This second housing includes an fiber 12 (FIG. 3), having a known ferrule 21 located on an end thereof, movably positioned therein. (Fiber 12 is also encased with an outer sheath protector cover (or coating) 10 which provides protection for the fiber, particularly at the external locations from the invention. Use of such covering materials is known in the art and further description is not believed necessary.) Thus, the invention to be defined in greater detail hereinbelow incorporates the use of at least three separate housings which are strategically positioned in a predetermined relationship with each other to provide the unique, movable orientation taught herein such that the invention's retained third housings (each having a respective second housing therein), as movably retained in a common (first) housing, are capable of being precisely aligned with a suitable common housing such as an interim adapter (defined above) or an optoelectronic module type of housing such as a shroud or housing extension (as defined in U.S. Pat. No. 5,005,939 and illustrated therein by the numeral 81). Such a shroud is also illustrated in FIG. 6 (e.g., no. 99), and will be further described below.

In FIG. 1, there the aforementioned first housing 82 in accordance with a preferred embodiment of the invention. Housing 82 is specifically designed for housing the aforementioned two optical fiber connectors 40 and 42 of the push-pull variety therein in such a manner that these connectors are each movable during subsequent positioning within the corresponding common connector housing (e.g. adapter or shroud). By the term push-pull as used herein is meant to define a form of optical fiber connector which is capable of being inserted within a corresponding housing or the like so as to be in alignment therein with another optical device (e.g., a module such as in U.S. Pat. No. 5,005,939 or, alternatively, another connector). Such connectors are known in the art, with several types currently available on the marketplace. As described herein, each connector includes therein at least one optical fiber and attached ferrule and is adapted for being aligned with another, substantially similiar connector also including therein a corresponding optical fiber or, if the connector is to be aligned with a module, a transmitter or photodiode such as defined in U.S. Pat. No. 5,005,939. The function of assembly 11 is thus to precisely align respective optical fiber connectors (40,42) so that the individual optical fibers therein are precisely aligned, both angularly and axially, with respective optoelectronic receiving structures. Such alignment is attained in an independent manner and, significantly, assures final positioning in a facile manner using a minimum of force.

As stated, the function of housing 82 is to positively retain connectors 40 and 42 in side-by-side orientation such that these two, now forming what may also be referred to as a duplex arrangement, may be simultaneously inserted within a common connector housing such as housing 99 (FIG. 6). The invention as defined herein uniquely enables these individual connectors 40 and 42, while being positioned in this side-by-side relationship, to be moved relative to each other in, significantly, at least three different directions (to be explained below). Such movement facilitates positioning of each duplex arrangement, thereby readily compensating for manufacturing tolerances within the outer housings of each singular connector and/or the common connector housing into which these will be positioned.

In FIG. 1, first - 82 is shown to include first and second chamber portions 87 and 88, within a base portion 80, each chamber portion of a substantially rectangular configuration, and designed for retaining a respective one of the connectors 40 and 42. As specifically shown in FIG. 1, chamber 87 is particularly adapted for retaining connector 40 while second chamber 88 is similarly adapted for retaining connector 42. Such retention is further assured by the provision of a plurality of upstanding rib members 89 on opposing internal walls of each rectangular shaped chamber. Although a total of four rib members 89 are depicted in FIG. 1 for each chamber, it is understood that only two of these per chamber are aligned within corresponding, mating grooves 43 located in opposing sides of each connector. It is further understood that the invention is not limited to the retention means( projecting ribs with associated grooves) shown herein. In the case of such projecting ribs, it is even further understood that the invention is not limited to the numbers of such elements as shown herein. Other combinations are readily possible.

The two rib members per chamber that are slidably positioned within the third housing grooves 43 are those at the front (forward) end of housing 82, this end understandably being that to the lower left in FIG. 1. The rear pair of ribs 89 per chamber may serve as rear stops for engaging the back surface 90 of the third housing 47, as shown, for example, in FIG. 2.

Further illustrated in FIG. 1 (and 5) are three differing directions of movement of the third housings 47 within the aforementioned chamber portions, 87 and 88, respectively. The external dimensions of each third housing 47 are less in height and width than the corresponding internal dimensions of the respective chamber portions 87 and 88. The dimensioning of the aforementioned third housing grooves 43 is greater in width and depth than the corresponding width and depth of the aforementioned first housing rib members 89, which are slidably positioned within grooves 43, when such housings are positioned into chamber portions 87 and 88, respectively. The differences of the external dimensions of the third housing 47 and the corresponding dimensions of the chamber portions (87,88) of the f housing (82), in addition to the differences in dimensions of the rib members (89) of the first housing and the corresponding dimensions of the grooves (43) contained in the third housings (47), accommodate movement of the third housings within the first housing in a side to side (horizontal) direction, front to back (lateral along the centerline of the third housing) direction had a top to bottom (vertical) direction. These directions of movement are, understandably, substantially perpendicular to each other. Significantly, such dimensional variations also allow for relatively minor angular displacement of third housings 47 within the larger first housing 82, as indicated, for example, by the angle "AD" in FIG. 2. That is, the relatively planar bottom surfaces of housings 47 may become angularly displaced relative to the also substantially planar bottom wall of housing 82. Of further significance, these dimensional variations, enabling the three different directions of movement and angular displacement as defined, also enable rotational movement of third housing 47, albeit on a relatively limited basis. Such rotational movement is represented in FIG. 2 ("R").

Although each member 87 and 88 as shown herein is of rectangular configuration (in side view and in cross-section), this is not meant to limit the invention in that other configurations are possible. In the embodiment as depicted herein, however, such a configuration is preferred to better accomodate the similar configuration for the housings (47) of each optical fiber connector. As to singular optical fiber connectors such as connectors 40 and 42, these include the aforementioned outer, third housing 47 which serves to contain the aforementioned second housing 22, which serves in turn to contain optical fiber 12 (FIG. 3) therein. Projecting from the other end of each second housing 22 is the remainder of the optical fiber (e.g., the designed cladding and other protective elements (e.g., protective cover 10) as known in the art). By way of example, one optical fiber connector capable of being successfully retained by the common, first housing 82, along with another, similar such connector, is a modified version of a simplex connector housing currently available on the market from the Nippon Telegraph and Telephone International Corporation, Tokyo, Japan, and referred to as a SC-01 connector. This modified housing the aforementioned grooves 43 in its external surface. Such connectors each include the described, rectangular (in cross section) housing 22, including therein the defined ceramic ferrule (see also below). Very low return loss is possible when using such connectors. The housings 22 used in these connectors typically have a length of only about one inch and cross-sectional dimensions of only about 0.35 inch by about 0.29 inch. Such a housing is also capable of including either single mode or multimode fibers. A preferred plastic material used for the outer housing 22 is polybutylene terephthalate, having a twenty percent glass fiber reinforcement.

As stated, each housing 22 also includes a ferrule 21 (see also FIG. 3) positioned therein and designed for accomodating the respective end of optical fiber 12. Use of such a ferrule assures positive retention of the optical fiber's terminal end and subsequent alignment thereof with a second optical fiber (e.g., located within a corresponding ferrule) or other such optical component. Each such connector also includes the aforementioned extending protective cover portion 10. It is understood that the invention is not to positive retention of the aforementioned optical connectors but that other connectors, including those having different external configurations, (e.g. round, hexagonal, etc.) may also be effectively retained, aligned and positioned using the teachings herein.

Significantly, ferrule 21 is retained within housing 22 in such a manner so as to permit concentric movement of the protruding end thereof around its' centerline ("CL" in FIGS. 2 and 3). There is further included within the housing a spring means 44 (FIG. 3) for biasing the ferrule in a lateral direction (to the left in FIG. 3) along this centerline. In particular, FIG. 3 shows a concentrically formed spring 44 surrounding a rear section 45 of ferrule 21, thus providing this bias means for the ferrule. This is not meant to limit the invention, however, in that other constructions(e.g. resilient foam or rubber) are possible to accomplish said biasing.

Third housing (47) is preferably of plastic material, and more preferably, polybutylene terephthalate. Other plastic materials are of course acceptable. The external dimensions of each second housing 22 (height and width) is such that it can be positioned inside the respective third housing 47 for movement therein. Protruding vertical rib members 23 on opposing sides of the second housing are of such projection as to permit entry into the third housing and also to extend into internal grooves 46 (FIG. 1) designed into respective, internal opposing sides of the respective third housing. Significantly, these receiving grooves 46 are of a greater width than the corresponding ribs 23. More specifically, each groove 46 is of a design such that its length accommodates lateral movement of rib 23 (and thus housing 22) of about 0.065 inches. Such an arrangement provides for retention of each second housing while enabling lateral movement of this housing along the centerline of the mated second and third housings.

In FIGS. 1 and 5, the base portion of first housing 82 is shown to comprise a slot 85 located at the rear of the base portion (to the right in FIG. 1) into which is positioned a grooved portion 17 of a protective boot 14. The boot surrounds the two optical fiber cables entering the first housing 82 with a tapered sheath portion 15 projecting outward from the first housing 82 along part of the optical fiber cables and a retainer portion 19 residing within the first housing 82, effectively providing retention and protection of the aforementioned cables. The cross-sectional thickness of the boot material is greater at the retainer portion, graduating in a decreasing mode from retainer to end of sheath where the optical fiber cables exit, as seen in the partial cross-section depicted in FIG. 2. This tapered configuration protects the optical fiber cables from damage as a result of extreme bending by substantially preventing such bending. Boot 14 is thus flexible, and is preferably of plastic or rubber material for this purpose.

The completed optical fiber duplex connector assembly 11 can now be mated with a common housing such as defined above, one example being a shroud 99 as shown in FIG. 6. The defined optical fiber containing ferrules are thus mated in an abutting relationship with respective opposing optical elements (e.g., transmitter and receiver), which may be contained in chambers within the shroud, or may be mated thereto, as defined, for example, in U.S. Pat. No. 5,005,939. to this positioning, it is necessary to precisely align the projecting ferrules 21 with respect to the corresponding chambers into which these components will be inserted. Due to manufacturing tolerances within typical common housings of the type shown and described herein, as well as within the respective housings and other components which form each optical fiber connector, such alignment and initial positioning has been relatively difficult to attain. As stated, the instant invention facilitates this alignment and positioning by enabling the paired optical fiber connectors to move independently in at least three different forms of movement within the larger, first housing 82 so as to possess relative freedom of movement therebetween immediately prior to insertion within a common housing such as shroud 99. It is further understood from the foregoing that it is also readily possible to provide a combination of other movements as defined herein. For example, the invention may also allow both lateral and vertical movement of the second housings 22 (FIG. 1), as well as concentric movement of the respective ferrules (FIG. 3) to occur simultaneously. Thus, a variety of combinations of movement are possible using the unique teachings of the invention.

To cover the housed connectors 40 and 42, connector 11 also includes a cover portion 84, as shown in FIGS. 1 and 4. Cover 84 includes horizontal rib members 93 designed for being slidably positioned within grooves 95 contained in external walls of base portion 80 (FIGS. 1 and 5). Cover 84 further includes a pair of projecting tabs 83 (FIG. 1) designed for being position within respective grooves 81 located within the rear external wall 101 (to the right in FIG. 1) of base portion 80. Positioning rib members 93 into grooves 95 and sliding the cover to position the projecting tabs 83 into the grooves 81, locates the cover portion 84 in proper alignment onto base portion 80. Retention of the cover 84 onto the aforementioned base portion 80 is accomplished using a downward projecting tab (91) (FIG. 2) from cover 84, which tab inserts within a groove 86 (FIG. 5) provided in base portion 80. Such positioning is arranged with the "sliding" of the cover 84, from the front of the base portion 80, towards the rear of the base portion (from left to right in FIG. 1), positioning projecting tabs 83 into grooves 81 and projecting tab 91 into groove 86, with a "snap". Such an arrangement, significantly, enables facile cover removal (e.g., for repair, or replacement with additional cover configurations), requiring only slight cover lifting (to effect tab release) and reverse sliding of the cover (to the front of base 80). Such cover replacement provides versatility for assembly 11 in that it enables positioning thereof within receiving housings of different designs. Of further significance is the ease of insertion/removal of individual connectors 40 and 42 to/from base housing 80 after cover 84 has been removed. (These connectors need only be lifted vertically.) Design of protective boot 15 also enables facile insertion/removal of the boot, adding further versatility to the invention, and also expediting removal of connectors 40 and 42.

There has been shown and described an optical fiber duplex connector assembly wherein a common, first housing is utilized to hold two individual optical fiber connectors in a substantially side-by-side relationship while still enabling these connectors to exhibit relative freedom of movement therebetween that this assembly can be more readily positioned within a common housing connector assembly or the like. The invention as defined herein is of relatively simple construction and can be readily adapted to many existing optical fiber connector designs. It may also be produced in a relatively inexpensive manner, and is readily adaptable to mass production. Of further significance, the invention is readily capable of being at least partially disassembled (removal of the cover portion) to enable facile separation of the internal optical connectors thereof (e.g., in the event that individual positioning of said connectors within respective receiving structures is desired).

While there have been shown and described what are at present considered the preferred embodiments of the invention, it will be obvious to those skilled in the art that various changes and modifications may be made therein without departing from the scope of the invention as defined by the appended claims.

What is claimed is:

1. An optical fiber duplex connector assembly comprising:
    a first housing;
    a pair of second housings, each of said second housings including therein an optical fiber and a ferrule secured to an end of said optical fiber, said ferrule movably positioned within said second housing; and
    a pair of third housing, each of said second housings being positioned within a respective one of said third housings, each of said third housings being movably positioned within said first housing.

2. The optical fiber connector of claim 1 wherein said first housing includes a base portion and a cover portion adapted for being positioned on said base portion.

3. The optical fiber connector of claim 2 wherein said first housing includes latching means for securing said cover portion to said base portion.

4. The optical connector of claim 3 wherein said latching means comprises a tab member on said cover portion and a groove within said base portion, said tab member adapted for being positioned within said groove.

5. The optical fiber connector of claim 2 wherein said base portion includes a pair of chamber portions, each of said third housings adapted for being movably positioned within a respective one of said chamber portions.

6. The optical fiber connector of claim 5 wherein each of said third housings includes a first width and each of said chambers includes a second width, said second width being greater than said first width.

7. The optical fiber connector of claim 5 wherein said base portion of said first housing includes a plurality of upstanding walls, said walls defining said chamber portions therein.

8. The optical fiber connector of claim 7 wherein at least one of said upstanding walls of each of said chamber portions includes a rib member, each of said third housings further including at least one groove therein, each of said rib members adapted for being positioned within a respective one of said grooves.

9. The optical fiber connector of claim 8 wherein said rib member includes a first width and said groove includes a second width, said second width of said groove being greater than said first width of said rib member.

10. The optical fiber connector of claim 1 further including a spring means positioned within said second housing for biasing said ferrule in a first direction within said second housing.

11. The optical fiber connector of claim 10 wherein said spring means comprises a compression spring concentrically positioned substantially about said ferrule.

12. The optical fiber connector of claim 1 wherein each of said second housings is movably positioned within said respective third housing.

13. The optical fiber connector of claim 12 wherein each of said second housings includes a plurality of upstanding walls, at least two of said upstanding walls of said second housings including a rib member, each of said third housings further including at least one groove therein, said rib members of said second housings adapted for aligning with and being located within a respective one of said grooves.

14. The optical fiber connector of claim 13 wherein each of said rib members of said second housings includes a first width and each of said grooves of said third housing includes a second width, each of said second widths being greater than said first widths.

15. The optical fiber connector of claim 14 wherein said second housings are movable in a lateral direction of motion within said third housings.

16. The optical fiber connector of claim 1 further including a boot substantially positioned within said first housing member, said optical fiber extending through said boot.

17. The optical fiber connector of claim 16, wherein said boot includes a sheath portion and a retaining portion, said portion being located within said first housing, said sheath portion projecting from said first housing.

18. The optical fiber connector of claim 17, wherein said boot further includes a groove portion located between said sheath portion and said retaining portion, said first housing further including a slot therein, said groove portion of said boot adapted for being positioned within said slot of said first housing.

19. The optical fiber connector of claim 17 wherein said boot is flexible, having a first thickness at said retaining portion and a second thickness less than said first thickness at said sheath portion to substantially prevent severe bending of said optical fiber within said boot.

20. The optical fiber connector of claim 16, wherein said boot is comprised of plastic material.

21. The optical fiber connector of claim 16, wherein said boot is comprised of rubber material.

22. The optical connector of claim 1, wherein each of said third housings is movable in at least three different directions of motion within said first housing.

23. The optical fiber connector of claim 22, wherein each of said third housings is adapted for being angularly displaced within said first housing.

24. The optical fiber connector of claim 22, wherein each of said third housings is rotationally movable within said first housing.

* * * * *